Aug. 4, 1970　　　　　L. S. VEGORS　　　　　3,522,892
TRAILER FOR TOWING ROAD VEHICLES
Filed April 29, 1968　　　　　　　　　　　　2 Sheets-Sheet 1

INVENTOR.
LESTER S. VEGORS
BY Rudolph L. Lowell
ATTORNEY.

Aug. 4, 1970   L. S. VEGORS   3,522,892
TRAILER FOR TOWING ROAD VEHICLES
Filed April 29, 1968   2 Sheets-Sheet 2
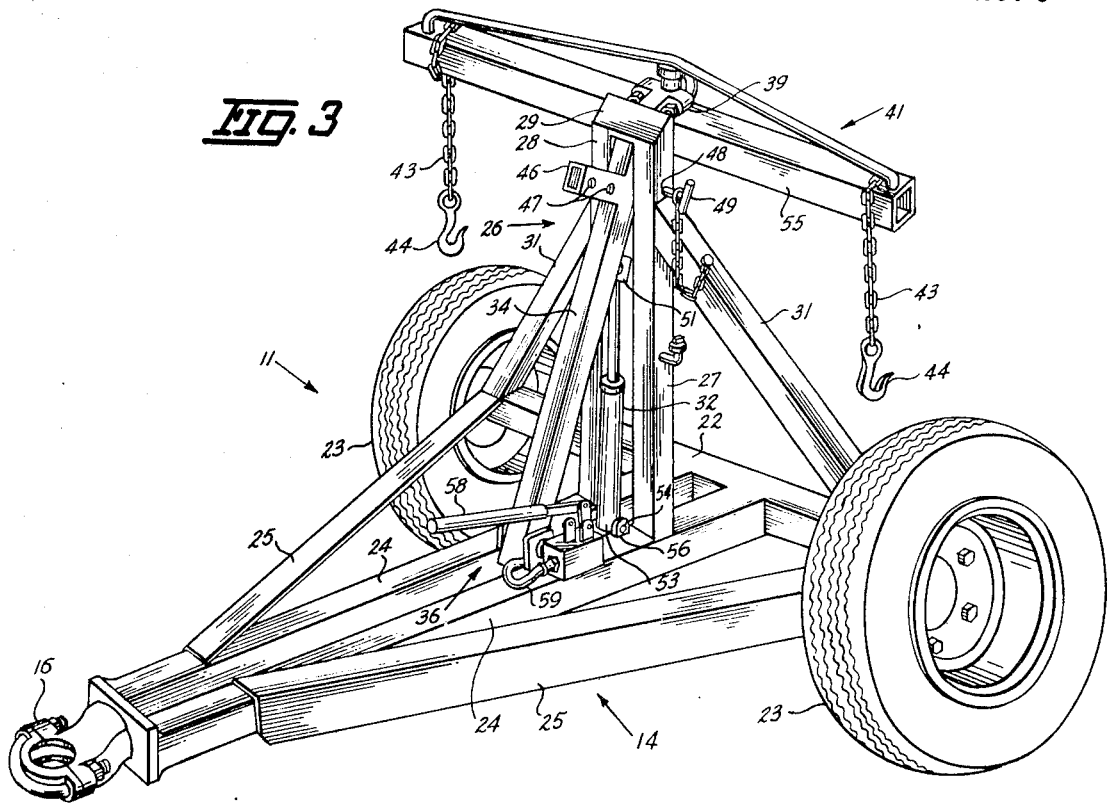
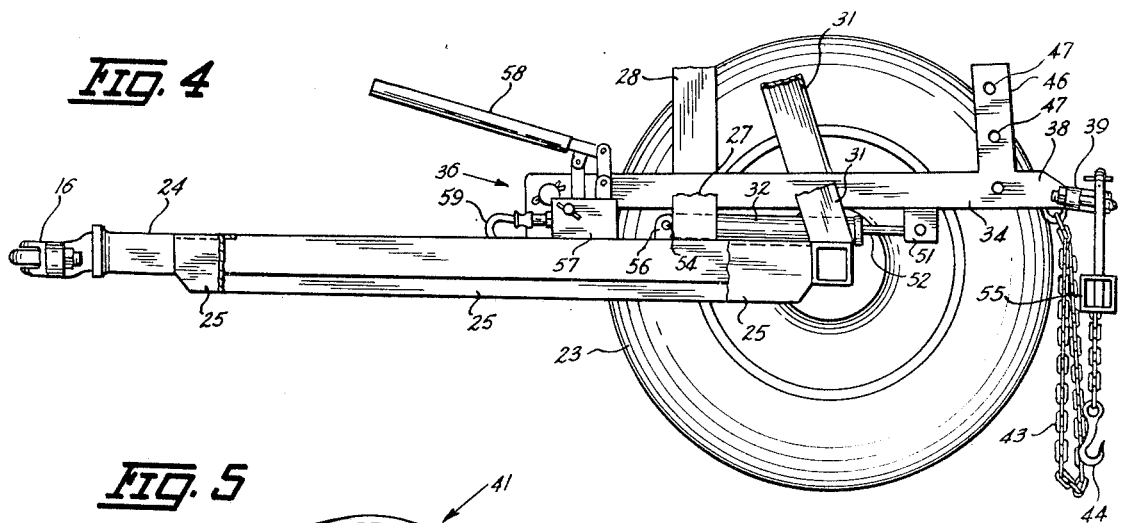
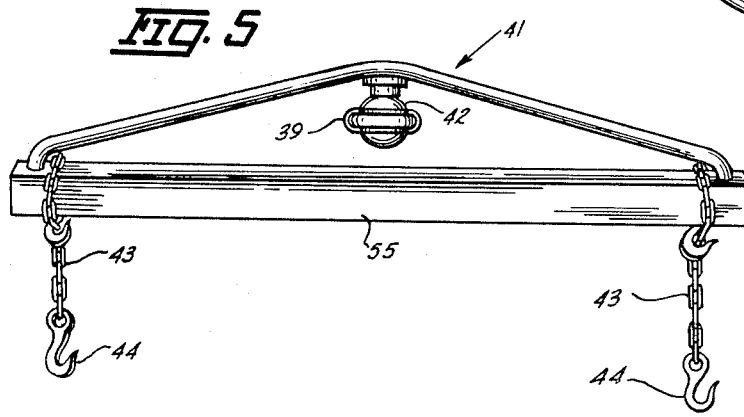
INVENTOR.
LESTER S. VEGORS.
ATTORNEY.

United States Patent Office 3,522,892
Patented Aug. 4, 1970

3,522,892
TRAILER FOR TOWING ROAD VEHICLES
Lester S. Vegors, 300 E. 2nd St.,
Webster City, Iowa 50595
Filed Apr. 29, 1968, Ser. No. 724,708
Int. Cl. B60p 3/12
U.S. Cl. 214—86          3 Claims

ABSTRACT OF THE DISCLOSURE

This invention provides a two wheel trailer apparatus for a towing vehicle for hoisting and towing a disabled motor vehicle. The tow trailer comprises an upright frame structure rigidly carried on the top side of a portable chassis unit forwardly of the wheel and axle assembly. The frame structure straddles a lift arm that is pivotally connected at one end of the chassis unit at a position forwardly of the upright frame structure and pivotally movable in a vertical plane to upright and lowered positions by a hydraulic lift cylinder. In its lowered position the lift arm extends horizontally with its free end located rearwardly of the wheel and axle assembly for connection with the front end of a disabled vehicle. On raising of the lift arm the disabled vehicle is drawn toward the tow trailer concurrently with the movement of the front wheels thereof to a raised position spaced upwardly and rearwardly of the trailer wheel and axle assembly. The lift arm, in its upright position may be locked to the upright frame for towing of the disabled vehicle.

SUMMARY OF THE INVENTION

The apparatus of this invention provides for the hauling of immobilized, broken down or damaged road vehicles where the breakdown or damage is such as to require the raising of one end of the disabled vehicle to enable it to be towed. The apparatus comprises a two wheel tow trailer for a usual passenger vehicle with the trailer having a lift arm pivotally connected at its front end to the trailer chassis forwardly of the wheel assembly for pivotal movement in a vertical plane extended longitudinally of the trailer. In a lowered position the lift arm is horizontally extended with its rear end located rearwardly of the trailer wheels. In such lowered position the lift arm is connectible to one end of the disabled vehicle and movable to an upright position whereby the connected end of the disabled vehicle is pulled forwardly and upwardly to an elevated position in a spaced relation with the wheel assembly of the trailer. The lift arm is pivotally movable between a pair of transversely spaced upright guide members mounted on the trailer chassis between the front end of the lift arm and the wheel assembly. In its elevated position the weight of the disabled vehicle is applied downwardly on the chassis of the trailer and forwardly of the wheel assembly so as to be distributed between the trailer and the passenger vehicle to provide for its being towed with maximum safety at speeds up to sixty miles per hour. On lowering of the lift arm, when connected to the disabled vehicle, such vehicle is concurrently moved rearwardly free of the trailer to a road supported position.

DETAILED DESCRIPTION OF THE INVENTION

Further objects, features and advantages of the invention will become apparent from the following description when taken in connection with the accompanying drawings wherein:

FIG. 3 is a front perspective view of the tow trailer;

FIG. 4 is a partial side elevational view of the tow trailer taken along line 4—4 of FIG. 3; and FIG. 5 is a side elevational view of a lift saddle or beam assembly that forms a part of the tow trailer.

Figure 1:
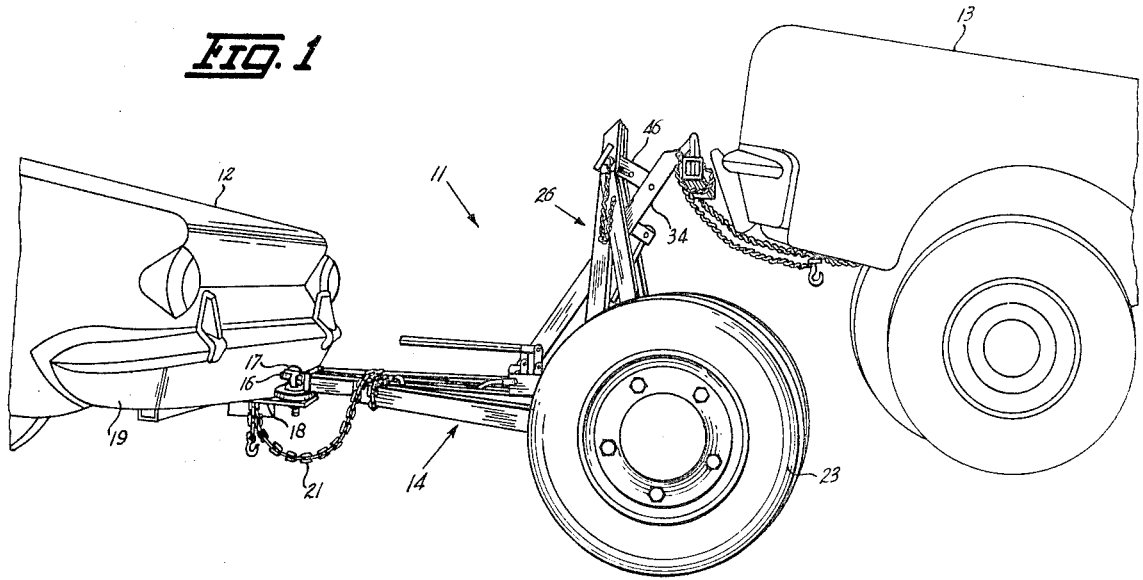
FIG. 1 is a perspective view of the tow trailer of this invention being shown in operational assembly with a towing vehicle and a disabled vehicle.

Referring to the drawings, the tow trailer apparatus of this invention, indicated generally at 11, is shown in operational assembly with a towing vehicle 12, such as a conventional passenger automobile, and a disabled vehicle 13. The trailer 11 includes a horizontal frame structure or chassis 14 of a generally triangular shape in plan view provided, at its forward or apex end, with a coupling member 16 which may be operatively connected to a hitch ball coupling 17 mounted on a draw bar 18 secured to the vehicle 12 and extended rearwardly from its bumper 19. A safety chain 21 connected to the trailer frame 14 is connectible with a rear end portion of the automobile 12.

The rear end of the frame 14 includes an axle member 22 extended transversely of the frame and carrying a pair of freely rotatable road wheels 23. The axle or base member 22 is connected to the apex of the frame 14 by a pair of longitudinally extended transversely spaced frame members 24 arranged to opposite sides of the longitudinal axis of the frame. A brace member 25 extends between and is connected to an end of the base member 22, and to the forward end of a longitudinal frame member 24.

Mounted on the frame members 24, forwardly of the base member 22 (FIG. 3), is an upright frame structure 26 consisting of a pair of transversely spaced upstanding leg members 27 and 28 each of which is carried on a corresponding frame member 24. The leg members 27 and 28 have their upper ends connected together by a cross member 29, and are suitably braced by members 31 connected to such upper ends and to the base or axle member 22.

A pivoted lift arm 34 shown in a horizontal lowered position in FIG. 4 has its front end pivotally supported at 36 between a pair of upright plates mounted on the longitudinal frame members 24 and extends rearwardly between the upright leg members 27 and 28. The rear end 38 of the lift arm 34, in a lowered position, is located rearwardly of the wheels 23 and has rigidly connected thereto a ball coupling 39.

A sling bar or saddle beam 41 is provided with a socket coupling 42 for swivel connection with the ball coupling 39 on the lift arm 34 (FIGS. 3 and 5). The beam 41 carries a chain 43 at each end for connection with the disabled vehicle 13. For this purpose each chain 43 is provided with a hook 44 at the lower end thereof, the hooks being shaped for engagement with any convenient length of a corresponding chain so that the hooks can be secured directly to the disabled vehicle or to a chain link.

Figure 2:
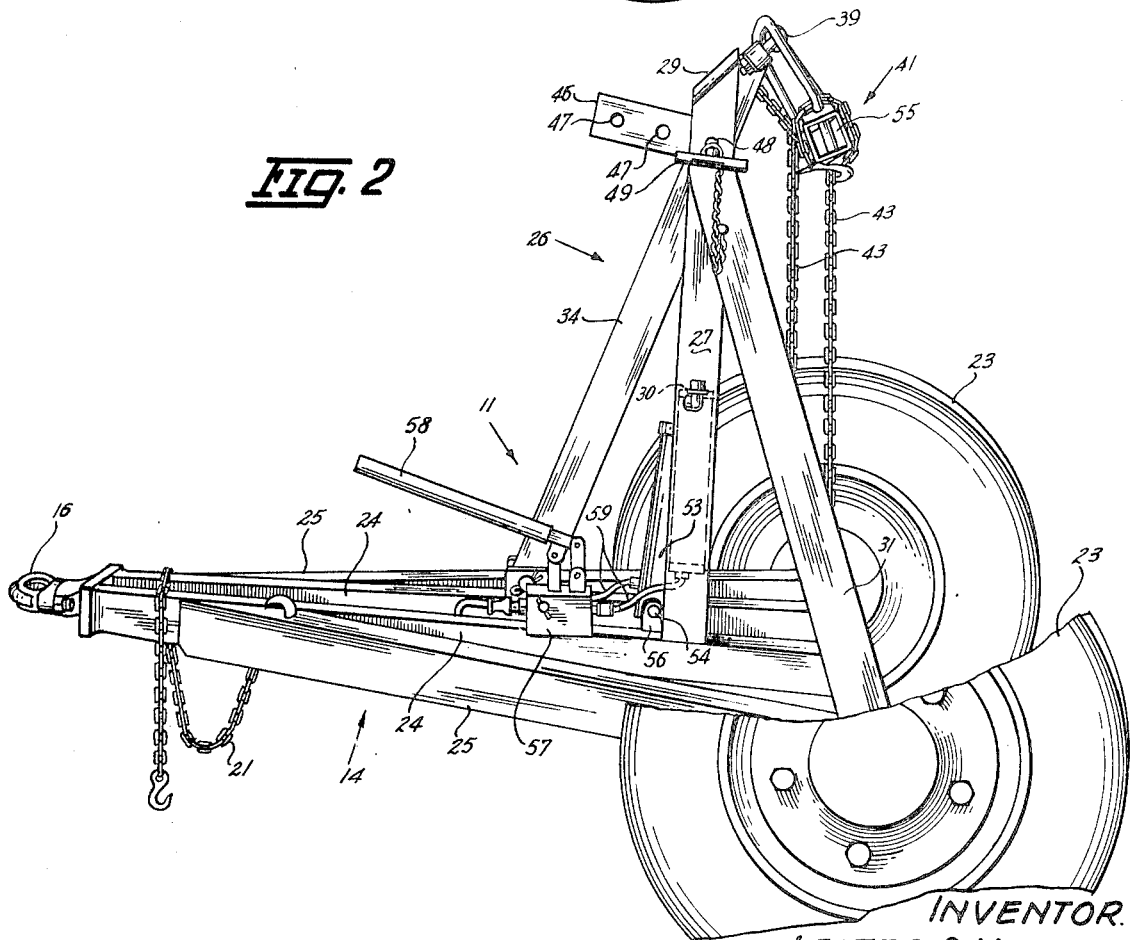
FIG. 2 is a side perspective of the tow trailer with wheel portions broken away to more clearly show its construction.

A lock arm 46 for holding the lift arm 34 in a raised position (FIGS 2 and 3) projects upwardly from the lift arm 34 at a position spaced forwardly from the rear end thereof. A series of openings 47, spaced longitudinally of the lock arm 46 are selectively movable in alignment with transversely aligned openings 48 formed adjacent the upper ends of the leg members 27 and 28. A pin 49 inserted through the openings 48 and an aligned opening 47 coacts with the lock arm 46 to mechanically lock the lift arm 34 in a raised position.

Secured to the lift arm 34 and extended downwardly therefrom at a position spaced forwardly of the lock arm 46 is a connector plate 51 to which is pivotally connected the free end of a piston rod 52 for the lift cylinder 32.

The closed end 53 of the hydraulic cylinder 32 is pivotally connected at 54 between a pair of upstanding ears 56 carried on the longitudinal frame at positions between the leg members 27 and 28 and the pivot connection 36 of the lift arm 34.

The piston rod 52 is extended and retracted from the open end of the cylinder 32 through the operation of a hydraulic pump 57 mounted on one of the longitudinal frame members 24. The pump 57 is provided with a manually operated handle 58 by means of which hydraulic fluid may be pumped from the reservoir 30 in the leg member 27 through the oil lines 59 and into the cylinder 32. The lift arm 34 is thus pivotally movable about the transverse pivot 36 from a horizontal position (FIG. 4) wherein the piston rod 52 is in a retracted position, to an upright position (FIGS. 2 and 3) wherein the piston rod is extended.

In operation, and with the tow trailer 11 connected to the towing vehicle 12, on release of fluid from the cylinder 32, by the action of gravity, the lift arm 34 is movable to its lowered horizontal position wherein the rear end 38 thereof projects rearwardly of the wheels 23. The attachment beam 55 is then positioned adjacent the level of the bumper of the disabled vehicle 13 for connection thereto by the securing means comprising the chains 43 and hooks 44. The lift arm 34 is then raised by manually operating the handle 58 on the pump 57 to extend the piston rod 52. As the lift arm moves from its horizontal position of FIG. 4 to the upright position therefor shown in FIGS. 2 and 3 the front end of the disabled vehicle is both lifted and pulled forwardly to an elevated position clear of the wheels 23 of the tow trailer 11. The weight of the vehicle 13 is thereby shifted on the trailer frame 14 and for distribution between the tow trailer and the towing vehicle 12. In other words, in the upright lifting position of the lift arm to a point forward of a vertical plane containing the wheel and axle assembly axis, the weight of the disabled vehicle is applied downwardly on the chassis of the trailer and forwardly of the wheel assembly so as to be distributed between the trailer and the passenger vehicle.

Throughout the lifting movement the attachment beam 41 is movable to provide for suspension of the vehicle in a downward direction therefrom. The swivel coupling of the beam 41 with the lift arm 34 also permits turning movement of the disabled vehicle relative to the tow trailer along with limitng any side sway or overriding of the disabled vehicle relative to the trailer. In its upright position the lift arm 34 may be mechanically locked for towing purposes by inserting the pin 49 through the aligned holes 47 and 48 in the lock arm 46 and leg members 27 and 28, respectively.

On completion of the towing operation and release of fluid from the cylinder 32, the disabled vehicle 13 is concurrently lowered and moved rearwardly away from the trailer in a clearance relation therewith. The pivotal movement of the lift arm 34 is guidably retained at all times by its travel between the upright legs 27 and 28 to assure a positive vertical lifting and lowering of the disabled vehicle, and a firm support of the lift arm 34 for holding the disabled vehicle in an elevated position thereof.

Although the invention has been described with respect to a preferred embodiment thereof it is to be understood that it is not to be so limited since changes can be made therein which are within the full intended scope of this invention as defined by the appended claims.

I claim:
1. A trailer apparatus for lifting and towing a disabled road vehicle comprising:
 (a) a portable frame unit having a wheel and axle assembly,
 (b) an upright frame structure secured to said frame unit located forwardly of said wheel and axle assembly,
 (c) a lift arm pivotally connected at one end to said frame unit forwardly of said upright frame structure for pivotal movement about an axis extended transversely of the frame unit,
 (d) means for pivotally moving said lift arm about said transverse axis from a first upright lifting position to a second horizontal position, the other end of said lift arm in said first position being located above said wheel and axle assembly and forwardly of a vertical plane containing the axis of said assembly whereby when said lift arm is in said first upright position, the weight of the disabled vehicle is distributed downwardly on said frame unit and forwardly of said wheel and axle assembly, and in said second position projected rearwardly of said wheel and axle assembly,
 (e) means carried at said other end of the lift arm connectible with one end of the disabled vehicle when the lift arm is in the second position therefor, the disabled vehicle on pivotal movement of the lift arm from the second position to the first position therefor being concurrently lifted and pulled forwardly so that in the first position of the lift arm the connected end of the disabled vehicle is spaced upwardly and rearwardly of said wheel and axle assembly, and
 (f) means for locking the lift arm to the frame structure in said first position therefor.

2. A trailer apparatus for lifting and towing a disabled road vehicle according to claim 1 wherein:
 (a) said upright frame structure includes a pair of upstanding leg members spaced apart transversely of said frame unit; and
 (b) said lift arm is pivotally moveable in a guided relation between said upright leg members.

3. A trailer apparatus for lifting and towing a disabled road vehicle according to claim 1 wherein:
 (a) the means for pivotally moving said lift arm includes a hydraulic lift cylinder having a piston rod extendable and retractible from one end thereof,
 (b) means for pivotally supporting the other end of said hydraulic cylinder on said frame unit at a position between the pivotal connection of said end of the lift arm and said upright frame structure, and
 (c) means pivotally connecting said piston rod to said lift arm intermediate the ends thereof, whereby said hydraulic cylinder, in said second position of the lift arm, is disposed beneath said lift arm.

References Cited

UNITED STATES PATENTS 2,509,435 5/1950 Huttinger.
2,553,229 5/1951 Barhorst _____ 280—402
2,644,595 7/1953 Levan.
3,127,037 3/1964 Newman.

ALBERT J. MAKAY, Primary Examiner

U.S. CL. X.R.

280—402